US006445692B1

(12) United States Patent
Tsatsanis (10) Patent No.: US 6,445,692 B1
(45) Date of Patent: Sep. 3, 2002

(54) BLIND ADAPTIVE ALGORITHMS FOR OPTIMAL MINIMUM VARIANCE CDMA RECEIVERS

(75) Inventor: Michail K. Tsatsanis, Springfield, NJ (US)

(73) Assignee: The Trustees of the Stevens Institute of Technology, Hoboken, NJ (US)

( * ) Notice: Subject to any disclaimer, the term of this patent is extended or adjusted under 35 U.S.C. 154(b) by 0 days.

(21) Appl. No.: 09/314,329

(22) Filed: May 19, 1999

Related U.S. Application Data

(60) Provisional application No. 60/086,063, filed on May 20, 1998.

(51) Int. Cl.[7] .............................................. H04B 1/707
(52) U.S. Cl. ...................... 370/342; 370/479; 370/335; 370/320
(58) Field of Search ................... 370/342, 343, 370/479, 441, 335, 320, 336, 341, 498, 179, 480; 375/340, 343, 350

(56) References Cited

U.S. PATENT DOCUMENTS

| | | | |
|---|---|---|---|
| 3,619,586 A | 11/1971 | Hoff, Jr. et al. ............. | 235/156 |
| 5,084,900 A | 1/1992 | Taylor .......................... | 375/1 |
| 5,204,874 A | 4/1993 | Falconer et al. ............... | 375/1 |
| 5,307,341 A | 4/1994 | Yates et al. .................... | 370/18 |
| 5,394,434 A | 2/1995 | Kawabe et al. ............. | 375/205 |
| 5,463,660 A | 10/1995 | Fukasawa et al. .......... | 375/205 |
| 5,579,304 A | 11/1996 | Sugimoto et al. ............. | 370/18 |
| 5,602,765 A | 2/1997 | Tanaka et al. ......... | 364/724.19 |
| 5,644,592 A | 7/1997 | Divsalar et al. ............ | 375/206 |
| 5,652,903 A | 7/1997 | Weng et al. ................ | 395/800 |
| 5,881,097 A | * 3/1999 | Lilleberg et al. ............ | 375/203 |
| 5,987,413 A | * 11/1999 | Bender ....................... | 375/206 |
| 6,014,373 A | * 1/2000 | Schilling et al. ............ | 370/342 |
| 6,081,516 A | * 6/2000 | Yoshida et al. ............. | 370/342 |

OTHER PUBLICATIONS

Honig, et al., "Blind Adaptive Multiuser Detection," IEEE Transactions on Information Theory, vol. 41, No. 4, pp. 944–960, Jul., 1995.

(List continued on next page.)

*Primary Examiner*—Daniel Hunter
*Assistant Examiner*—Andrew T Harry
(74) *Attorney, Agent, or Firm*—Wolff & Samson (57) ABSTRACT

The present invention utilizes a filter that works on an algorithm that filters out multiuser and multi-path interference. The algorithm is programmed into the DSP processors of receiver handsets and base stations in cellular and multihop wireless radio networks which use the CDMA technology. It can also be implemented in hardware. Additionally, the invention works in a blind manner such that it learns without requiring training samples. The algorithm can be expressed as updating the receiver parameter vector f(n) as:

$$f(n+1)=[I-C(C^HC)^{-1}C^H][f(n)-m_y y(n)y^H(n)f(n)]+C(C^HC)^{-1}g(n)$$

wherein y(n) is a data vector for each transmitted bit $W_1(n)$ from user 1, the receiver will estimate that bit by filtering y(n), i.e.

$$w_1(n)=f^H(n)y(h),$$

where $^H$ denotes Hermitian; g(n) corresponds to the multipath parameters and is updated by a separate revision; and C is a matrix constructed from elements of the desired user's spreading code. Importantly, the filter based on this algorithm is adaptive and can be used blind, i.e. no training of the device is necessary prior to operation, rather, the device is improved each time the algorithm is run.

11 Claims, 8 Drawing Sheets

OTHER PUBLICATIONS

Liu, et al., "Low Complexity Receivers for CDMA Communications Over Frequency–Selective Channels," Proc. SPAW'97, pp. 265–268, La Villette, Paris, France, Apr. 16–18, 1997.

Schodorf, et al., "A Constrained Optimization Approach to Multiuser Detection" IEEE Transactions on Signal Processing, vol. 45, No. 1, pp. 258–262, Jan. 1997.

Shen et al., "Bind Adaptive Multiuser CDMA Detection Based on a Linear Projection Constraint," Proc. SPAW'97, pp. 261–264, La Villette, Paris, France, Apr. 16–18, 1997.

Tsatanis, "Inverse Filtering Criteria for CDMA Systems", IEEE Trans. on Signal Processing, vol. 45, No. 1, pp. 102–112, Jan., 1997.

Van Veen, "Minimum Variance Beamforming", Adaptive Radar Detection and Estimation, John Wiley & Sons, Inc., 1992.

Wang, et al., "Blind Multiuser Detection: A Subspace Approach", IEEE, Trans. on the Information Theory, Vol. 44, No. 2, pp. 677–690, Mar. 1998.

* cited by examiner

BLIND ADAPTIVE ALGORITHMS FOR OPTIMAL MINIMUM VARIANCE CDMA RECEIVERS

This application claims the benefit of copending provisional application Ser. No. 60/086,063 filed on May 20, 1998.

RELATED APPLICATIONS

This application claims the priority of Provisional Patent Application Ser. No. 60/086,063, filed May 20, 1998, the entire disclosure of which is expressly incorporated herein by reference.

GOVERNMENT LICENSE RIGHTS

The present invention has been made under grants by the National Science Foundation Grant and the Army Research Office Grant, and the government may have certain rights to the subject invention.

BACKGROUND OF THE INVENTION

1. Field of the Invention

The present invention generally relates to CDMA receivers and to blind adaptive equalizers for a multiuser CDMA communication system.

2. Related Art

Recently Code Division Multiple Access (CDMA) telecommunication systems have gained ground and popularity against rival TDMA/FDMA solutions, despite the increased complexity of the receiver. In the CDMA framework, different users employ distinct spreading codes but transmit at the same time and frequency. CDMA systems break up digital communications into bits at the sending end, and spray the bits across a slice of the spectrum. At the receiving end, the bits are reassembled based on signatures, or wave forms, associated with the bits of the corresponding users. A problem with CDMA systems arises because of interference from other users. This is especially prevalent where there are weak signal users and/or there are reflections from buildings, mountains or other structures that distort signals (multi-path distortions). Various interference suppression schemes have been used in the past to separate out Multi-User Interference (MUI) to obtain a clean signal at the receiving end. In one such scheme, signals are filtered out, one by one, from the strongest to the weakest.

Significant effort has focused recently on designing multiuser receivers in order to suppress MUI and deliver the promised capacity gains of CDMA technology. While optimal solutions have been derived, their exponentially increasing complexity renders them inappropriate for systems with a large number of users. For this reason, recent efforts have concentrated on suboptimal linear solutions and have investigated ways to derive the receiver parameters from the data.

Multiuser receiver design can be divided into two categories based on whether training sequences are used or not. In the first category, non-blind MMSE receivers can be adaptively implemented if the desired signal is known at the receiver, while in the second category, a blind approach has to be employed. Blind subspace methods show good performance, but the required SVD of large matrices leads to a heavy computational load. On the contrary, blind adaptive multiuser detectors significantly reduce the computational burden. A scheme was presented by Honig, et al., "Blind Adaptive Multiuser Detection" IEEE Transactions on Information Theory, Vol. 41, No. 4, pp. 944–960, July 1995, for the case when multipath interference is absent and showed performance equivalent to that of the MMSE receiver. In Wang, et al., "Blind Multiuser Detection: A Subspace Approach" IEEE, Tans. On the Information Theory, Vol. 44, No.2, pp. 677–690, March 1998, an adaptive implementation based on subspace tracking method was shown to improve performance at the expense of more computational complexity. The method of Honig, et al. was later extended by adding more constraints by Schodorf, et al., "A constrained Optimization Approach to Multiuser Detection" IEEE Transactions on Signal Processing, Vol. 45, No. 1, pp. 258–262, January 1997. Unfortunately, in the presence of multipath and multichip interference, minimum variance solutions are known to be sensitive to signature mismatch. A solution for that case was attempted by Tsatsanis, "Inverse Filtering Criteria for CDMA Systems, IEEE Trans. On Signal Processing, Vol. 45, No. 1, pp. 102–112, January, 1997, and later by Shen, et al., Blind Adaptive Multiuser CDMA Detection Based on a Linear Projection Constraint" Proc. SPAWC'97, pp. 261–264, La Villette, Paris, France, Apr. 16–18, 1997, by forcing the receiver response to delayed copies of the signal of interest to zero. With these additional constraints, minimum variance techniques are applicable, but have inferior performance since they treat part of the useful signal as interference. Recently however, constrained optimization solutions were developed which combine all multipath components of the signal of interest and jointly minimize MUI while maximizing the signal component at the receiver output, Tsatsanis, et al., "Performance Analysis of Minimum Variance CDMA Receivers," Proc. 13st Intl. Conf. On Digital Signal Processing (DSP97), Vol. 1, pp. 379–382, Santorini-Hellas, Greece, Jul. 2–4, 1997. A related development from a different viewpoint was also reported in Liu, et al., "Low Complexity Receivers for CDMA Communications over Frequency-selective Channels," Proc. SPAWC'97, pp.265–268, La Villette, Paris, France, Apr. 16–18, 1997. These blind methods exhibit superior performance which is close to that of the trained MMSE receiver Tsatsanis, et al. Unfortunately however, adaptive implementations of the solution of Tsatsanis, et al. are not straightforward, as they correspond to the optimization of a non-linear cost function.

Other efforts in this area include:

Kawabe, et al., U.S. Pat. No. 5,394,434 multiple-access (CDMA) demodulator which stores received chip data in a separate memory for each transmitting station. Each memory area holds data for a plurality of symbols. When the receiving station finishes receiving a signal from one transmitting station the corresponding area is designated for processing. All data stored in the designated area is correlated with the spreading code of the transmission station to generate correlated values for a plurality of symbols. Estimated symbols are derived from the correlated value and the temporarily stored. The difference between each estimated symbol value and the previous estimate is multiplied by the spreading code of the designated station to generate remaining interference value. The remaining interference values are subtracted from all chip data stored in the memory except for data stored in a designated area thereby updating the memory contents. A demodulated value is output for the oldest symbols stored in a designated memory area.

Divsalar, et al., U.S. Pat. No. 5,644,592, discloses a method of decoding a spread spectrum composite signal to provide an improved method of interference cancellation for CDMA communications. The system comprises a parallel interference cancellation (IC) system that reduces the degrading effect of multiuser interference. The patent discloses a method of decoding a spread spectrum composite signal comprising plural user signals spread with plural respective codes, wherein each user signal is despread, filtered to produce a signal value, analyzed to produce a tentative decision value, respread, summed with other re-spread signals to produce combined interference signals, combining a portion of each signal value with one of the combined interference signals and the composite signal to produce an estimate of a respective user signal to preserve information contained in the user signal. Each signal is processed for each user by a matched filter which would be dominated by the corresponding user signal and will produce a maximum signal to noise ratio (SNR). Thereafter, a re-scaling amplifier amplifies the signal with an estimate of the transmitted power. The method attempts to cancel the multiuser at each stage of the IC device.

Hoff, et al., U.S. Pat. No. 3,619,586 discloses a second-recuversive digital filter optimized by the equation $$f(n)=CX(n)+2(\%+\beta_2)f(n-1)-f(n-2)+\beta_1[\%+\beta^2)f(n-1)-f(n-2)]$$

where the sum of $\%+\beta_2$ may be provided as a single coefficient K. The filter can be used as a band-pass filter or as a oscillator.

Tanaka, et al., U.S. Pat. No. 5,602,765 discloses an adaptive transfer function estimating method for estimating with a projection algorithm function of an unknown system and its output in an acoustic canceler, active noise control, or the like. The estimated transfer function correcting vector calculation calculates an estimated transfer function correcting vector on the basis of the error signal and the input signal to the unknown system.

Weng, et al., U.S. Pat. No. 5,652,903 discloses a co-processor for use with a digital signal processor used on an integrated circuit to provide multiple communication functions. The device includes a database interface for receiving input samples and algorithm co-efficients from memory, a sequencer for storing a processing algorithm, an internal memory for storing intermediate results, a data core including an address generation and arithmetic unit for executing operational instructions of the signal processing algorithm to produce resultant signals from input samples.

Sugimoto, et al., U.S. Pat. No. 5,579,304 discloses a code division multiple access (CDMA) receiver which operates by despreading code of the relevant station and estimating the value of the symbol. Then the spreading code is used to estimate interference signals and the baseband signal is modified by subtracting the estimated interference signal. The canceled interference from the baseband signal corresponds to the information in the estimated symbol value. The method is repeated successively from one stage to the next.

Fukasawa, et al., U.S. Pat. No. 5,463,660 discloses a block-spreading CDMA communication system comprising a modulator for use in a receiving station for receiving a combined signal from a plurality of transmitting stations. The received signal yields baseband chip data that is stored in memory. When the receiving station receives a block from a transmitting station, it designates that transmitting station and the corresponding memory area for processing. Each data block stored in the designated memory area is correlated with a set of product codewords obtained by spreading all codewords in a set of orthogonal codewords by the spreading code of the designated transmitting station, and the product codeword that gives a maximum correlation value for that block is selected. For each block, the selected product code and maximum correlation value are used to calculate a set of interference correction data which data is subtracted from the corresponding chip value stored in the other memory areas to update all data stored in the memory except for the data stored in the designated memory area.

Yates, et al., U.S. Pat. No. 5,307,341 discloses a frequency comb multiple access (FCMA) communications system in which address and message data are transmitted on a common channel to different users. The data includes signatures corresponding to an address and a data message directed to the address. The invention provides a coding structure to minimize overlap between user signatures and accordingly, minimize errors between different users.

Falconer, et al., U.S. Pat. No. 5,204,874 discloses a method and apparatus for encoding and decoding in a communications system. In decoding, received data samples are grouped and transformed according to one of two algorithms, one which generates a plurality of soft decision similarity metrics and index data symbols for each group, and one which consists of deinterleaving by group each group of data samples within a predetermined size block and subsequently generating a plurality of soft decision similarity metrics and index data symbols. After the group samples are transformed, at least one estimated data bit is generated by utilizing maximum likelihood decoding techniques to derive at least one data bit from the index data symbols and associated soft decision metrics.

Taylor, U.S. Pat. No. 5,084,900 discloses a system including an inbound satellite communication link from terminal stations to a hub station for sending digital data packets encoded with a CDMA code for code division multiple access during synchronized time slots on a contention channel. Each of the digital data packets is encoded with the same CDMA code during a first transmission, but each packet is encoded with an alternate CDMA code during a subsequent transmission.

Further works include those by Comon, et al., "Tracking a Few Extreme Singular Values and Vectors in Signal Processing," Proc. of the IEEE, Vol. 78, No. 8, pp. 1327–1343, August 1990; Frost, "An Algorithm for Linearly Constrained Adaptive Array Processing," Proc. of the IEEE, Vol. 60, No. 8, pp. 926–935, August 1972; Haykin, "Adaptive Filter Theory," 3rd Edition, Prentice Hall, Upper Saddle River, N.J. 1996; Johnson, et al., "Array Signal Processing: Concepts and Techniques," Prentice Hall, Englewood Cliffs, N.J. 1993; and Van Veen, "Minimum Variance Beamforming," Adaptive Radar Detection and Estimation, John Wiley & Sons, Inc., 1992.

The entire disclosure of these efforts of others is expressly incorporated herein by reference. None of these previous efforts, taken alone or in combination, teach or suggest all of the elements of the present invention, nor do they teach or suggest all of the benefits thereof.

OBJECTS AND SUMMARY OF THE INVENTION

It is an object of the present invention to significantly reduce multi-user interference in a CDMA system.

It is an additional object of the present invention to maximize the signal component of a desired signal at the receiving end of a CDMA system.

It is a further object of the present invention to provide a filter means for the receiving end of a CDMA system which is blind and adaptive.

It is even a further object of the present invention to provide blind, adaptive equalizers for a multi-user CDMA system having reduced complexity by employing constrained optimization techniques.

It is still yet another object of the present invention to provide blind, adaptive algorithms for filtering multi-user and multi-path interference.

It is even another object of the invention to provide an algorithm that provides improved results each time it runs.

It yet another object of the present invention to provide a method which operates in multi-path environments by accounting for multi-path components of the signal of interest.

It is yet another object of the present invention to provide a blind, adaptive algorithm for use in a CDMA receiver which recursively minimizes the output variance of the received signal subject to certain constraints which are also jointly updated.

The present invention utilizes a filter that works on an algorithm that filters out multiuser and multi-path interference. The algorithm is programmed into the DSP processors of receiver handsets and base stations in cellular and multihop wireless radio networks which use the CDMA technology. It can also be implemented in hardware. Additionally, the invention works in a blind manner such that it learns without requiring training samples. The algorithm can be expressed as updating the receiver parameter vector f(n) as:

$$f(n+1)=[I-C(C^HC)^{-1}C^H][f(n)-m_{\tilde{y}}(n)y^H(n)f(n)]+C(C^HC)^{-1}g(n)$$

wherein y(n) is a data vector for each transmitted bit $W_1(n)$ from user 1, the receiver will estimate that bit by filtering y(n), i.e.

$$w_1(n)=f^H(n)y(h),$$

where $^H$ denotes Hermitian; g(n) corresponds to the multi-path parameters and is updated by a separate revision; and C is a matrix constructed from elements of the desired user's spreading code. Importantly, the filter based on this algorithm is adaptive and can be used blind, i.e. no training of the device is necessary prior to operation, rather, the device is improved each time the algorithm is run.

BRIEF DESCRIPTION OF THE DRAWINGS

Other important objects and features of the invention will be apparent from the following Detailed Description of the Invention taken in connection with the accompanying drawings in which.

DETAILED DESCRIPTION OF THE INVENTION

Constrained optimization methods have received considerable attention as a means to derive blind multiuser receivers with low complexity. The receiver's output variance is minimized subject to appropriate constraints which depend on the multipath structure of the signal of interest. When multipath is present, the constraint equations can be written in parametric form, and the constraint parameters jointly optimized with the linear receiver's parameters. Adaptive solutions have been developed for this joint, constrained optimization problem. Both stochastic gradient and RLS type algorithms have been developed. The performance of the proposed methods is compared with other blind and trained methods and turns out to be close to the trained MMSE receiver. Moreover, the constraint parameters are shown to converge to the channel parameters of the user of interest at high SNR.

The present invention derives blind adaptive receivers for a multiuser CDMA communication system with reduced complexity by employing constrained optimization techniques. The output variance of the received signal is recursively minimized subject to certain constraints which are also jointly updated. Three different algorithms are proposed from different viewpoints. Two variations of constrained LMS methods are obtained by integrating ideas from array processing. Another adaptive algorithm corresponding to the GSC (Generalized Sidelobe Canceller) structure is also presented, which can be thought of as an updating rule of the equivalent problem without constraints. These stochastic gradient based methods suffer from slow convergence as most LMS algorithms do, which offsets their low computational complexity. Therefore, the last version of the algorithms with faster convergence is built upon RLS ideas. In contrast with past work in this area, the current method can operate in multipath environments by taking into account all multipath components of the signal of interest. The method of the present invention also has advantages over other receivers in the sense that it only updates the coefficients for one filter without using a RAKE receiver structure. Despite their lower computational complexity however, it turns out that the proposed algorithms exhibit improved performance. Furthermore, it is shown that they enjoy global convergence. Simulation results further support these claims according to comparisons with trained MMSE as well as other blind receivers.

The invention presents a novel method for rejecting interference in wireless communication systems. It consists of a series of algorithmic steps which can be implemented in the receiver's software (or specialized hardware). By running this algorithm, the receiver continuously adjusts its interference rejection filter to adapt to a changing interference environment.

The invention is applicable to Direct-Sequence CDMA communication systems. In those systems a number of simultaneous users are transmitting in the same frequency band and at the same time, but utilize a distinct signature waveform (or chip waveform) to transmit their data. The receiver has to reject the interfering waveforms and demodulate the user of interest.

The invention is applicable to digital CDMA receivers, that is to receivers which digitize the incoming signal and process it using digital hardware. In particular, the receiver is required to sample the received signal at least once (or more) per chip period, in this way collecting a number of digital samples per bit. This vector of data samples (or digitized bit waveform) is processed by the receiver's adaptive filter.

Figure 1:
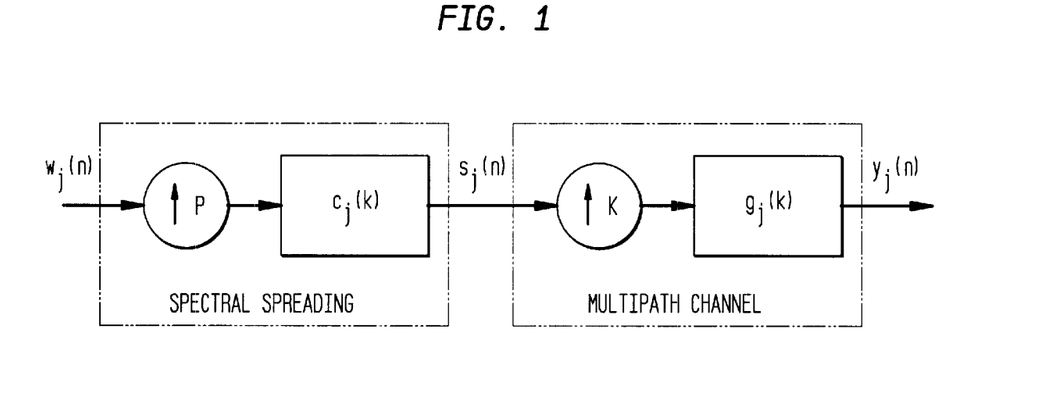
FIG. 1 is a schematic of DS/SS signal in multipath: Discrete time model.

In the DS-CDMA framework, each user transmits digital information after modulating it by a distinct spreading sequence. Let user j, j=1, ..., J use a spreading code $c_j(k)$, k=0, ..., P−1 of length P to transmit P chips per information symbol. Let the chip sequence be transmitted through a linear channel with a baseband impulse response $g_{c,j}(t)$[1] (including the transmitter and receiver filters), and let the receiver collect K samples per chip. Then the received discrete-time signal $y_j(n)$ due to user j is (see FIG. 1)

$$y_j(n) = \sum_{l=-\infty}^{\infty} w_j(l) h_j(n - d_j K - lKP) \tag{1}$$

[1] We use subscript c to denote continuous-time signals.

$$h_j(n) = \sum_{m=-\infty}^{\infty} g_j(m) c_j(n - mK) \tag{2}$$

where $g_j(n) = g_{c,j}(t)|_{t=nT_c/K}$ is sampled impulse response of the multipath channel, $h_j(n)$ is the signature of user j (the convolution of the code with the channel—see (2)), $T_c$ is the chip period and $d_j$ is the delay of user j in chip periods[2]. The received signal y(n) at the receiver is a superposition of the signals from all users plus noise v(n)

$$y(n) = \sum_{j=1}^{J} y_j(n) + v(n)$$

where v(n) is assumed to be AWGN with zero-mean and variance $\sigma_v^2 = E\{\|v(n)\|^2\}$. Without loss of generality we may assume that the delay $0 \leq d_j < P$. We will also assume that $g_j(n)$ has finite impulse response of maximum order q (typically q<<P in many applications). Finally, each user's information bearing sequence $w_j(n)(j=1, \ldots, J)$ is zero-mean, i.i.d., independent of other users with variance $\sigma_{w_j}^2 = E\{\|w_j(n)\|^2\}$.

[2] Fractional delays are absorbed in the channel parameters $g_j(n)$.

Let us collect L=P+q measurements of $y_j(n)$ in a vector $y_j=[y_j(nP), \ldots, y_j(nP+L-1)]^T$ (j=1, ..., J). If we consider a single sample per chip (K=1), and if the receiver is synchronized to user 1 ($d_1=0$), then signal due to user 1 is[3]

$$y_1(n) = h_1 w_1(n) + \tilde{h}_1 w_1(n-1) + \tilde{\tilde{h}}_1 w_1(n+1)$$

where $y_1(n)=[y_1(nP), \ldots, y_1(nP+L-1)]^T$ is the collection of measurements of $y_1(n)$ and $h_1 = [h_1(0), \ldots, h_1(P+q-1)]^T$ is the signature vector of user 1, $\tilde{h}_1 = [h_1(P), \ldots, h_1(P+q-1), 0, \ldots, 0]^T$ and $\tilde{\tilde{h}}_1 = [0, \ldots, 0, h_1(0), \ldots, h_1(q-1)]^T$ are signatures of the bits of the bits $w_1(n-1), w_1(n+1)$. The signal due to other asynchronous users (j=2, ..., J, $d_j \neq 0$ and $d_j > q$) is $$y_j(n) = \tilde{h}_{j,a} w_j(n-1) + \tilde{\tilde{h}}_{j,a} w_j(n+1)$$

where $\tilde{h}_{j,a} = [0, \ldots, 0, h_j(0), \ldots, h_j(P+q-1-d_j)]^T$, and $\tilde{\tilde{h}}_{j,a} = [h_j(P+q-d_j), \ldots, h_j(P+q-1), 0, \ldots, 0]^T$ are signatures from the other J−1 interfering users. If we consider the superposition of all users, the received signal will be $$y(n) = \sum_{j=1}^{J} y_j(n) = h_1 w_1(n) + H w(n) + v(n) \tag{3}$$

where $w_1(n)$ is the signal of interest, while $H = [\tilde{h}_1, \tilde{\tilde{h}}_1, \tilde{h}_{2,a}, \tilde{\tilde{h}}_{2,a}, \ldots, \tilde{h}_{J,a}, \tilde{\tilde{h}}_{J,a}]$, $w(n)=[w_1(n-1), w_1(n+1), w_2(n), w_2(n-1), \ldots, w_J(n), w_J(n-1)]^T$ and v(n) are interference and noise components respectively. Furthermore, notice that the signature of user 1 can be decomposed as (c.f. eq. (2))

$$h_1 = C g_1 \tag{4}$$

where $$C = \begin{bmatrix} c_1(0) & & 0 \\ \vdots & \ddots & c_1(0) \\ c_1(P-1) & & \vdots \\ 0 & \ddots & c_1(P-1) \end{bmatrix}_{(P+q)\times(q+1)}, g_1 = \begin{bmatrix} g_1(0) \\ \vdots \\ g_1(q) \end{bmatrix}_{(q+1)\times 1} \tag{5}$$

and $g_1$ is the unknown multipath parameter vector for user 1. This structure of the user's signature will be exploited in this paper to derive blind adaptive multiuser receivers with the ability to accommodate multipath distortions. We focus on adaptive implementation of the minimum variance batch approach. As will become clear soon, adaptive solutions to this problem are non-trivial due to the non-linear nature of the cost function.

[3] In the sequel we assume without loss of generality that user 1 is the desired user.

Constrained Minimum Variance Receivers

If we focus on linear solutions, the receiver design problem is equivalent to determining a parameter vector f which (when operating on the data) provides an estimate of the desired signal $$\hat{w}_1(n) = f^H y(n). \tag{6}$$

Vector f may be optimized by minimizing the output variance [5], [16]

$$J = E\{\|\hat{w}_1(n)\|^2\} = f^H R_y f, R_y = E\{y(n) y^H(n)\}, \tag{7}$$

subject to the constraint that the response of the user of the interest is a constant $$f^H h_1 = 1. \tag{8}$$

This approach was proposed in Honing in the absence of multipath, in which case the signature $h_1$ coincides with the user's code $h_1 = c_1$ and is a priori known. Similar ideas have been extensively studied in array processing in the context of Minimum Variance Distortionless Response (MVDR) beamforming, Van Veen.

In the multipath case, an extended set of constraints can be used (one constraint for each delayed copy of the signal)

$$C^H f = g \tag{9}$$

where g is a parameter vector to be determined. For a given g the solution to this constrained optimization problem is obtained using Lagrange multipliers $$f_{opt}=R_y^{-1}C(C^H R_y^{-1} C)^{-1}g, \quad (10)$$

while the minimum output variance is $$J_{min}=f_{opt}^H R_y f_{opt} = g^H(C^H R_y^{-1} C)^{-1}g. \quad (11)$$

It was proposed to optimize the unknown vector g by maximizing $J_{min}$, that is, by maximizing the energy of the signal component after the interference has been suppressed[4]. This max/min blind approach exhibits near-optimal performance and is related to Capon beamforming ideas in array processing.

[4] The maximization of (11) is not a well defined problem unless $\|g\|$ is fixed to a constant. For this reason a normalized version of (11) is maximized.

On the other hand it involves the inversion of $R_y$ which may be computationally prohibitive in systems with large spreading factor P ($R_y$ is a (P+q)×(P+q) matrix). In this paper, we derive adaptive algorithms for estimating f and g by directly optimizing the Lagrangian cost function and avoiding the inversion of $R_y$. Both stochastic gradient and RLS solutions are investigated.

Constrained LMS Algorithm: Method I

Let us consider the Lagrangian cost function parameterized by f and g $$j_1 = f^H R_y f + \lambda^H(C^H f - g) + (f^H C - g^H)\lambda + \rho(g^H g - 1). \quad (12)$$

where $\lambda$ and $\rho$ are the Lagrange multipliers. Notice that we fix $\|g\|=1$ in (12). Since we wish to minimize (12) with respect to f and maximize it with respect to g, we consider the following gradient search procedures $$f_{n+1}=f_n-\mu_f \nabla_f J_1 \quad (13)$$

$$g_{n+1}=g_n+\mu_g \nabla_g J_1 \quad (14)$$

where $\mu_f, \mu_g$ are two step sizes. The gradients in (13) and (14) may be obtained from (12) as $\nabla_f J_1 = R_y f + C\lambda$, $\nabla_g J_1 = \rho g - \lambda$ respectively. Then (13) and (14) become $$f_{n+1}=f_n-\mu_f(R_y f_n + C\lambda_n) \quad (15)$$

$$g_{n+1}=g_n+\mu_g(\rho_n g_n - \lambda_n) \quad (16)$$

where $\lambda_n$ and $\rho_n$ also need to be updated at each iteration. In order to avoid buildup of roundoff errors in constrained optimization problems, it was suggested in Frost to update the Lagrange multipliers in such a way that constraints are satisfied at each iteration. By using (15) and enforcing the constraints on f as $C^H f_{n+1}=g_n$, one can solve for $\lambda_n$ $$\lambda_n = \frac{1}{\mu_f}(C^H C)^{-1}(C^H f_n - \mu_f C^H R_y f_n - g_n) \quad (17)$$

Substituting (17) in (15), we arrive at the updating rule for f $$f_{n+1}=\Pi_C^\perp(f_n-\mu_f R_y f_n)+C(C^H C)^{-1}g_n \quad (18)$$

where $$\Pi_C^\perp \triangleq I - C(C^H C)^{-1}C^H. \quad (19)$$

It can be seen that $g_n$ is needed in (18), hence an update equation for g should be derived as well.

If we substitute (17) in (16) we obtain an update equation for $g_{n+1}$ as $$g_{n+1}=\mu_g \rho_n g_n + x_n \quad (20)$$

where $$x_n = g_n - \frac{\mu_g}{\mu_f}(C^H C)^{-1}[C^H(f_n - \mu_f R_y f_n) - g_n]. \quad (21)$$

To get the final update equation for g, we need to determine the unknown $\rho_n$ in (20). Following the ideas of Frost once more, we impose the quadratic constraint on $g_{n+1}$ $$g_{n+1}^H g_{n+1} = \|g_{n+1}\|^2 = 1, \quad (22)$$

at each iteration. Substituting (20) in (22) a second order equation for $\rho_n$ is obtained $$a_1 \rho_n^2 + a_2 \rho_n + a_3 = 0 \quad (23)$$

where $$a_1 = \mu_g^2 \|g_n\|^2, \quad a_2 = \mu_g(g_n^H x_n + x_n^H g_n), \quad a_3 = x_n^H x_n \quad (24)$$

There may be two real solutions if the discriminant of equation (23) is nonnegative, that is $\Delta = a_2^2 - 4a_1 a_3 \geq 0$. Then, we choose the smaller of the two solutions for $\rho_n$ as $$\rho_n = \frac{1}{2a_1}\left(-a_2 - \sqrt{a_2^2 - 4a_1 a_3}\right), \quad (25)$$

for reasons that will become clear later. The case of $\Delta<0$ corresponds to incompatible linear and quadratic constraints for certain constrained problems. In our case however, the optimal solution for f is guaranteed for every g (c.f. eq. (10)) and therefore the constraints are compatible (at least in the neighborhood of the optimal point). Once $\rho_n$ is obtained, $g_{n+1}$ can be updated according to (20) and (21). However, no update for g should be performed in the occassional situation when $\Delta<0$.

Finally, by using an instantaneous approximation $\hat{R}_y(n) = y(n)y^H(n)$ for $R_y$, we arrive at a constrained LMS type algorithm. The steps of the algorithm are summarized in Table 1.

TABLE 1

Proposed Constraint LMS ALGOrithm: Method I

Step 1: Initialize f and g at n = 0, and choose step sizes $\mu_f, \mu_g$

Step 2: Pre-compute $\Pi_C^\perp = I - C(C^H C)^{-1}C^H$

Step 3: For n = 0, 1, 2, ...

(1) update the receiver $f_{n+1} = \Pi_C^\perp[f_n - \mu_f y(n)y^H(n)f_n] + C(C^H C)^{-1}g_n$ (2) compute $x_n = g_n - \frac{\mu_g}{\mu_f}(C^H C)^{-1}\{C^H[f_n - \mu_f y(n)y^H(n)f_n] - g_n\}$ (3) compute $a_1 = \mu_g^2 \|g_n\|^2$, $a_2 = \mu_g(g_n^H x_n + x_n^H g_n)$, $a_3 = x_n^H x_n$ (4) if $a_2^2 - 4a_1 a_3 \geq 0$ then compute $\rho_n = \frac{1}{2a_1}\left(-a_2 - \sqrt{a_2^2 - 4a_1 a_3}\right)$, and update constraint vector g as $g_{n+1} = \mu_g \rho_n g_n + x_n$ otherwise let $g_{n+1} = g_n$ (no update for $g_n$)

In this algorithm, all constraints are explicitly considered in one cost function. As will be seen, this will facilitate our theoretical analysis. However, the quadratic constraint on g results in a second order equation for $\rho_n$ which has to be solved at each iteration. In order to avoid the extra computations, one might try to abolish the constraint on the norm of g and instead normalize $g_n$ at each iteration. This approach results in a different variation of our LMS algorithm, which is discussed next.

Constrained LMS Algorithm: Method II

Let us write our Lagrangian cost function now as $$J_2 = f^H R_y f + \lambda^H (C^H f - g) + (f^H C - g^H) \lambda, \quad (26)$$

where $\lambda$ is the Lagrange multiplier corresponding to constraints for our receiver f. Then two update equations for f and g can be formed as $$f_{n+1} = f_n - \mu_f \nabla_f J_2 \quad (27)$$

$$g_{n+1} = g_n + \mu_g \nabla_g J_2 \quad (28)$$

which will adaptively minimize $J_2$ with respect to f and maximize $J_2$ with respect to g. Since a change in the length of g does not affects the performance of the receiver f (see (10), (11)), we may project $\nabla_g J_2$ onto the space orthogonal to g to obtain the following equation to update g $$g_{n+1} = g_n + \mu_g \left( I - \frac{g_n g_n^H}{g_n^H g_n} \right) \nabla_g \cdot J_2 \quad (29)$$

In order to guarantee the constraint $\|g\|=1$ at each iteration, we will normalize $g_{n+1}$ by $$g_{n+1} \leftarrow \frac{g_{n+1}}{\|g_{n+1}\|}. \quad (30)$$

By using (26), equations (27) and (29) become $$f_{n+1} = f_n - \mu_f (R_y f_n + C \lambda_n) \quad (31)$$

$$g_{n+1} = g_n - \mu_g \left( I - \frac{g_n g_n^H}{g_n^H g_n} \right) \lambda_n \quad (32)$$

The Lagrange multiplier $\lambda_n$ is again obtained by enforcing the constraint $C^H f_{n+1} = g_n$ and the result is identical to eq. (17). By substituting (17) in (31), (32) we obtain the recursions $$f_{n+1} = \Pi_C^\perp [f_n - \mu_f R_y f_n] + C(C^H C)^{-1} g_n \quad (33)$$

$$g_{n+1} = g_n + \frac{\mu_g}{\mu_f} \left( I - \frac{g_n g_n^H}{g_n^H g_n} \right) (C^H C)^{-1} [\mu_f C^H R_y f_n - C^H f_n] \quad (34)$$

where $$\Pi_C^\perp = I - C(C^H C)^{-1} C^H \quad (35)$$

Considering (33)–(35) together with (30) and using the instantaneous approximation $\hat{R}_y(n) = y(n) y^H(n)$ for $R_y$ we obtain our simpler constrained LMS method, which is summarized in Table 2.

Blind Adaptive GSC Algorithm: Method III

In beamforming and array processing literature, linearly constrained optimization problems are often transformed into unconstrained ones. This leads to the separation of the mainlobe

TABLE 2

Proposed Constraint LMS Algorithm: Method II

Step 1: Choose initial conditions for f and g, and appropimate step sizes $\mu_f$, $\mu_g$
Step 2: Compute $\Pi_C^\perp = I - C(C^H C)^{-1} C^H$
Step 3: For n = 0, 1, 2, ...
  (1) update receiver $f_{n+1} = \Pi_C^\perp [f_n - \mu_f y(n) y^H(n) f_n] + C(C^H C)^{-1} g_n$
  (2) update constraint vector $g_{n+1}$
    a. compute $g'_{n+1} = g_n + \frac{\mu_g}{\mu_f} \left( I - \frac{g_n g_n^H}{g_n^H g_n} \right) (C^H C)^{-1} [\mu_f C^H y(n) y^H(n) f_n - C^H f_n]$
    b. normalize $g'_{n+1}$ to obtain $g_{n+1} = \frac{g'_{n+1}}{\|g'_{n+1}\|}$ (signal part) from the sidelobe (noise part) by using the so called GSC (Generalized Sidelobe Canceller) structure for the receiver [19]. In our problem, we have a linear constraint for the receiver f as $C^H f = g$ and a quadratic constraint for the constraint vector $\|g\|=1$. We can partition this problem into two parts, one part corresponding to the linear constraint which can be transformed to an unconstrained one, the other part corresponding to the normalization step. Following this idea we begin our derivation by analyzing the matrix C first.

As can be seen by (5), the columns of C are shifted versions of the spreading code of the user of interest, so they are linearly independent and make up a signal subspace basis (not necessarily orthogonal). If we consider the matrix $\bar{C}$, whose columns represent a basis for the orthogonal complement of the space spanned by the columns of C, then the columns of C and $C_n$ span the entire space, and we can express any vector f in this space as $$f = Cs - C_n u \quad (36)$$

Applying the constraint $C^H f=g$ to (36) yields $C^H Cs=g$, and therefore $s=(C^H C)^{-1}g$. Then (36) may be written as $$f = C(C^H C)^{-1}g - C_n u. \tag{37}$$

In (37) we have managed to parametrize f by g and u in such a way that the constraints are guaranteed to be satisfied. Using this parametrization, we may transform our constrained optimization problem to an unconstrained one for f. We still use the output variance $f^H R_y f$ as our cost function $J_3$. According to (37), $J_3$ can be expanded as $$J_3 = g^H (C^H C)^{-1} C^H R_y C(C^H C)^{-1}g + u^H C_n^H R_y C_n u - g^H (C^H C)^{-1} C^H R_y C_n u - u^H C_n^H R_y C(C^H C)^{-1}g \tag{38}$$

We want to minimize $J_3$ with respect to u and maximize it with respect to g. Therefore, we may construct two update equations for u and g respectively $$u_{n+1} = u_n - \mu_u \nabla_u \cdot J_3 \tag{39}$$

$$g_{n+1} = g_n + \mu_g \nabla_g \cdot J_3 \tag{40}$$

The derivatives in (39) and (40) are computed by using (38)

$$\nabla_u \cdot J_3 = C_n^H R_y C_n u - C_n^H R_y C(C^H C)^{-1} g \tag{41}$$

$$\nabla_g \cdot J_3 = (C^H C)^{-1} C^H R_y C(C^H C)^{-1}g - (C^H C)^{-1} C^H R_y C_n u \tag{42}$$

Substituting (41) into (39) and (42) into (40), the recursive algorithm for computing both u and g are $$u_{n+1} = u_n - \mu_u C_n^H R_y C_n u_n + \mu_u C_n^H R_y C(C^H C)^{-1} g_n \tag{43}$$

$$g_{n+1} = g_n + \mu_g (C^H C)^{-1} C^H R_y C(C^H C)^{-1} g_n - \mu_g (C^H C)^{-1} C^H R_y C_n u_n \tag{44}$$

Each step is followed by normalizing $g_{n+1}$ as $$g_{n+1} \leftarrow \frac{g_{n+1}}{\|g_{n+1}\|}, \tag{45}$$

in order to guarantee that the quadratic constraint for g is satisfied. Then based on (37), our receiver vector at iteration n+1 can be constructed as $$f_{n+1} = C(C^H C)^{-1} g_{n+1} - C_n u_{n+1} \tag{46}$$

Equations (43)–(46) form our blind adaptive GSC algorithm. Substituting $R_y$ by $y(n)y^H(n)$ we obtain the LMS-GSC algorithm summarized in Table 3.

TABLE 3

Proposed GSC Algorithm: Method III

Step 1: Choose initial values for u and g, and approprimate step sizes $\mu_u, \mu_g$
Step 2: For n = 0, 1, 2, . . .
    (1) compute $R_y = y(n)y^H(n)$
    (2) update $u_{n+1} = u_n - \mu_u C_n^H \hat{R}_y C_n u_n + \mu_u C_n^H \hat{R}_y C(C^H C)^{-1} g_n$
    (3) update $g_{n+1} = g_n + \mu_g (C^H C)^{-1} C^H \hat{R}_y [C(C^H C)^{-1} g_n C_n u_n]$
    (4) normalize $g_{n+1}$ as $g_{n+1} \leftarrow \frac{g_{n+1}}{\|g_{n+1}\|}$
    (5) construct receiver $f_{n+1} = C(C^H C)^{-1} g_{n+1} - C_n u_{n+1}$ RLS Algorithm: Method IV All three algorithms we have developed in (Method I–III) are stochastic gradient based methods and their convergence depends on the eigenvalue spread of the data covariance matrix $R_y$. Hence, they may experience slow convergence rates at high SNR. For this reason we explore RLS based solutions with faster convergence in the sequel despite their higher computational complexity.

Motivated by the optimal solutions for the receiver f and our constraint vector g in (10) and (11) respectively, we need to compute $R_y^{-1}$ recursively to facilitate the computation of the eigenvector of the matrix $(C^H R_y^{-1} C)^{-1}$ corresponding to its maximum eigenvalue (or the eigenvector of the matrix $C^H R_y^{-1} C$ corresponding to its minimum eigenvalue) while reducing the number of computations. As described in [4], we can use Kalman RLS recursions to update $\hat{R}_y^{-1}$ as follows:

$$k(n) = \frac{\hat{R}_y^{-1}(n-1)y(n)}{v + y^T(n)\hat{R}_y^{-1}(n-1)y(n)} \tag{47}$$

$$\hat{R}_y^{-1}(n) = \frac{1}{v}\hat{R}_y^{-1}(n-1) - \frac{1}{v}k(n)y^T(n)\hat{R}_y^{-1}(n-1) \tag{48}$$

where $0<v\leq 1$ is the forgetting factor. The algorithm can be initialized by $\hat{R}_y^{-1}(0) = \delta I$ where $\delta$ is a large positive number. Once $\hat{R}_y^{-1}(n)$ is updated, we can form the matrix $C^H \hat{R}_y^{-1}(n)C$. Since the latter is a small size matrix with dimension $(q+1)\times(q+1)$ (recall q<<

TABLE 4

Proposed GSC Algorithm: Method III

Step 1: Choose $0 < v \leq 1$ and $R_y^{-1}(0) = \delta I$ ($\delta$ is a large positive number)
Step 2: For n = 1, 2, . . .

(1) compute $k(n) = \frac{\hat{R}_y^{-1}(n-1)y(n)}{v + y^T(n)\hat{R}_y^{-1}(n-1)y(n)}$     (2) update $\hat{R}_y^{-1}(n) = \frac{1}{v}\hat{R}_y^{-1}(n-1) - \frac{1}{v}k(n)y^T(n)\hat{R}_y^{-1}(n-1)$     (3) from the matrix $C^H \hat{R}_y^{-1}(n)C$ and apply SVD to get its eigenvector $g_{min}(n)$ corresponding to its minimum eigenvalue $\alpha_{min}$     (4) construct the receiver $f_n = \alpha_{min} \hat{R}_y^{-1}(n) C g_{min}(n)$ P), its eigenvector $g_{min}(n)$ corresponding to its minimum eigenvalue $\alpha_{min}$ may be obtained by directly applying SVD decomposition. Alternatively, subspace tracking procedures may be employed to further reduce the computations, see Comon, et al. Finally by utilizing the formula (c.f. eq. (10))

$$f_n = \alpha_{min} \hat{R}_y^{-1}(n) C g_{min}(n) \qquad (49)$$

we can obtain the receiver $f_n$ at iteration n. The steps of this method are summarized in Table 4.

There are more efficient ways to update the matrix $C^H \hat{R}_y^{-1}(n) C$ (e.g., using Cholesky factors (Johnson et al.).

Simulations

The applicability and performance of the different proposed methods were verified by our simulation results. We used the average output SINR (Signal to Interference and Noise Ratio) at the receiver end as a performance index and we compared our methods with the trained MMSE receiver and the receiver presented in Honig et al. The average output SINR at the i-th iteration can be defined as (see equations (3), (4) and (5))

$$SINR_{av}[i] = \frac{\sigma_w^2 \sum_{r=1}^{K} \|f_r^H[i] C g_1\|^2}{\sum_{r=1}^{K} \{\sigma_v^2 f_r^H[i] f_r[i] + \sigma_w^2 f_r^H[i] H H^H f_r[i]\}} \qquad (63)$$

where K is the number of Monte Carlo runs, $\sigma_w^2$ an $\sigma_v^2$ are the chip sequence and noise power respectively, and the subscript r refers to a particular Monte Carlo run.

Wire tested the proposed methods on a 10 user CDMA system with BPSK modulation in a 20 dB AWGN environment. Each user used different gold sequences of length 31 as code sequences, and transmitted i.i.d. bits through different multipath channels of length equal to 4 chip periods. The receiver was synchronized to the desired user (user 1). We considered signals from other users arriving at the receiver with arbitrary delays $d_j$ (j=2, . . . . , 10) and let user 1 be 10 dB weaker than each of the other 9 equal-power users. In this way, a severe MUI environment was simulated. 50 Monte Carlo runs were performed for each experiment with N=3000 bits per realization.

Figure 2A:
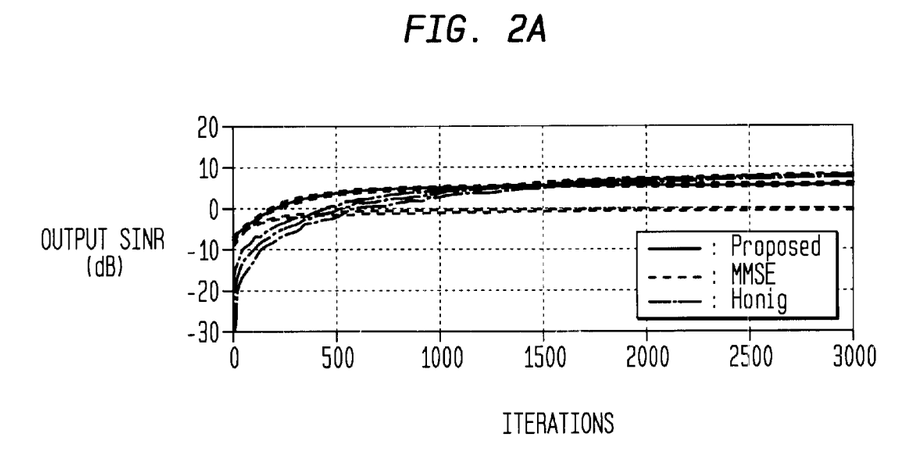
FIGS. 2a and 2b are graphs of SNIR comparison of LMS methods with varied step sizes for asynchronous and synchronous cases, respectively.
Figure 2B:
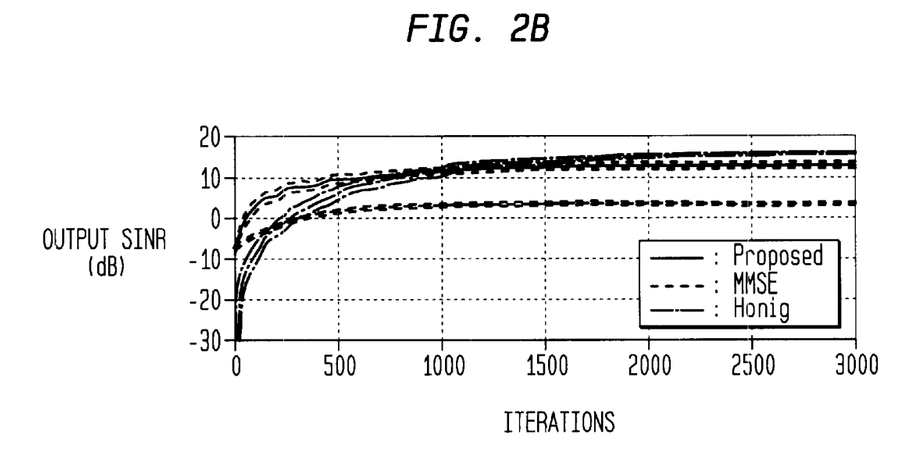

In the first experiment, we tested our constrained LMS algorithm (see Table I) and compared it with the trained MMSE receiver (Haykin) and the method of Honig, et al. in FIG. 2. FIG. 2(a) shows the results for the asynchronous case while FIG. 2(b) for the synchronous. The output SINR (mean±standard deviation) is plotted versus time. It can be seen that the proposed method (solid line) has performance close to that of the trained MMSE receiver (dashed line) and is substantially better than the method of Honig, et al. (dash-dotted line). FIG. 2(a) indicates that our method can compensate for multipath effect and suppress MUI successfully even in this severe near-far situation. However, our method has about 2 dB loss compared with the trained MMSE. This performance loss is explained by the greater misadjustment of the blind method due to the fact that the blind cost function is orders of magnitude greater than the MSE one, even at the optimum point. Similar results can be observed in FIG. 2(b) for the synchronous case, where all three methods show slightly improved performance.

Figure 3A:
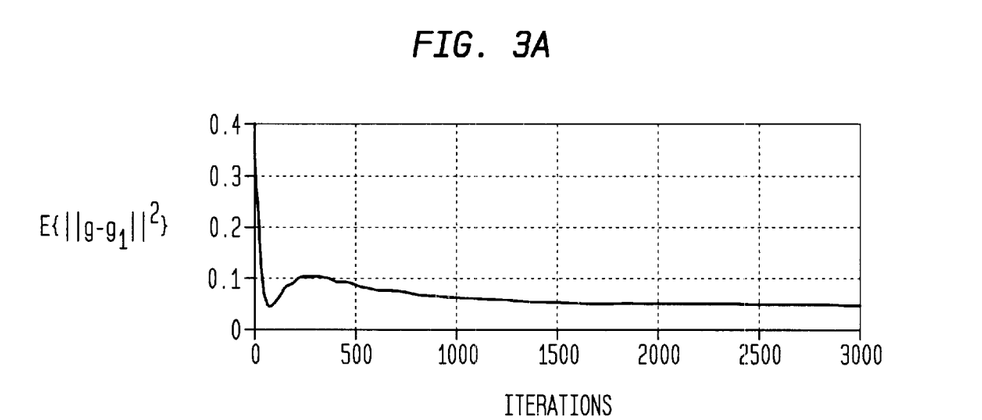
FIGS. 3a and 3b are graphs of channel estimation error of LMS methods with varied step sizes for asynchronous and synchronous cases, respectively.
Figure 3B:
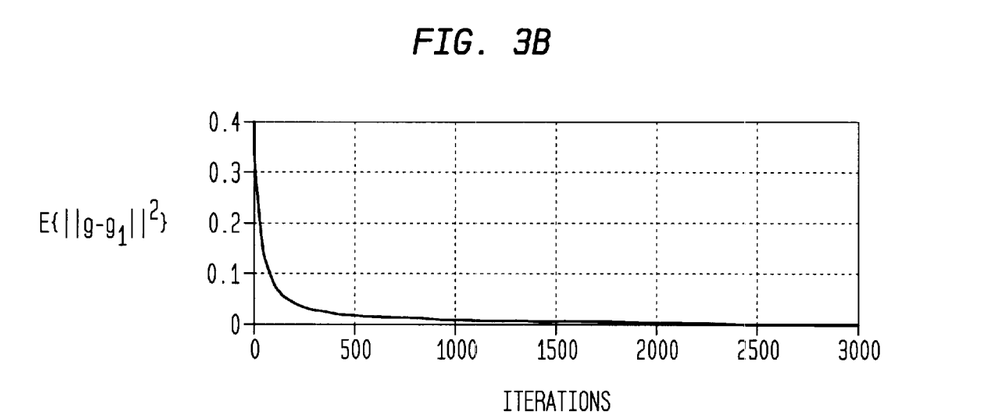

In FIG. 3, the channel estimation error[5] $E\{\|g-g_1\|^2\}$ is plotted versus iterations. Correspondingly FIGS. 3(a) and 3(b) give the results for the asynchronous and synchronous case respectively. There is a residual constant error in both plots which is a function of the SNR (SNR=20 dB in our case). These results show that g may be used as an approximation for the channel parameters.

[5] Here the channel $g_1$ experienced by user 1 has been normalized $\|g\|=1$ in order to obtain the reasonable comparison.

Figure 4A:
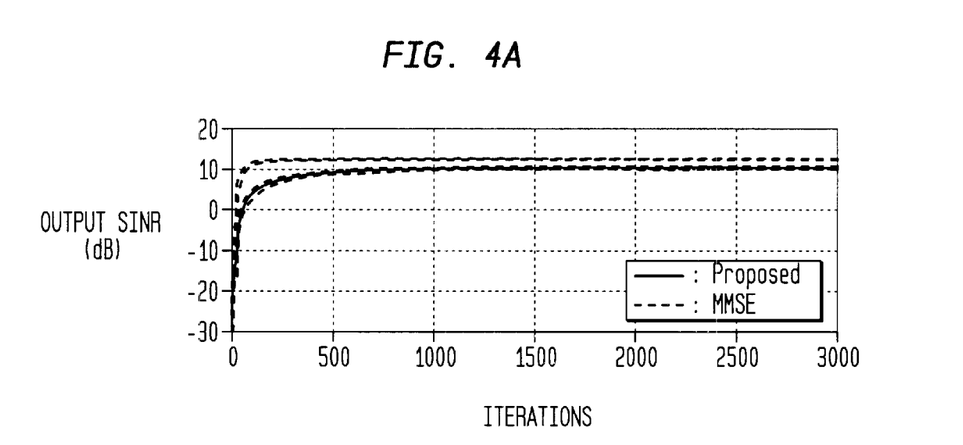
FIGS. 4a and 4b are graphs of SNIR comparison of RLS methods for asynchronous and synchronous cases, respectively.
Figure 4B:
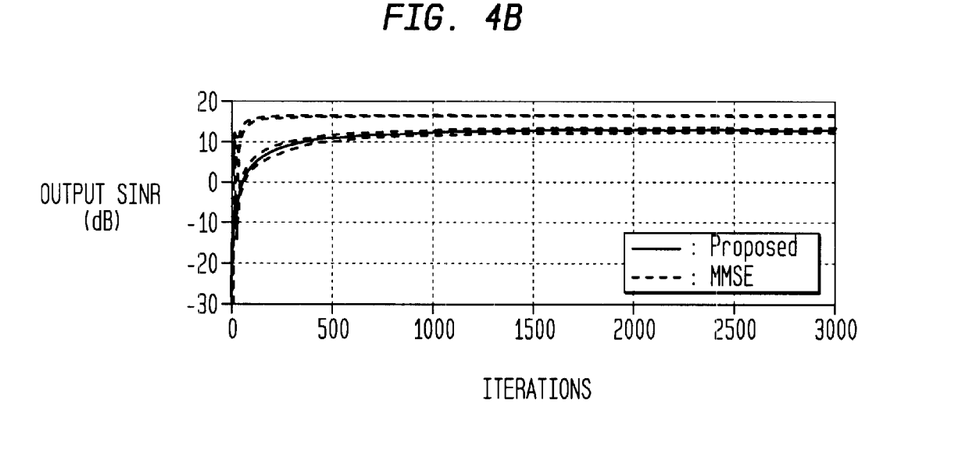
Figure 5A:
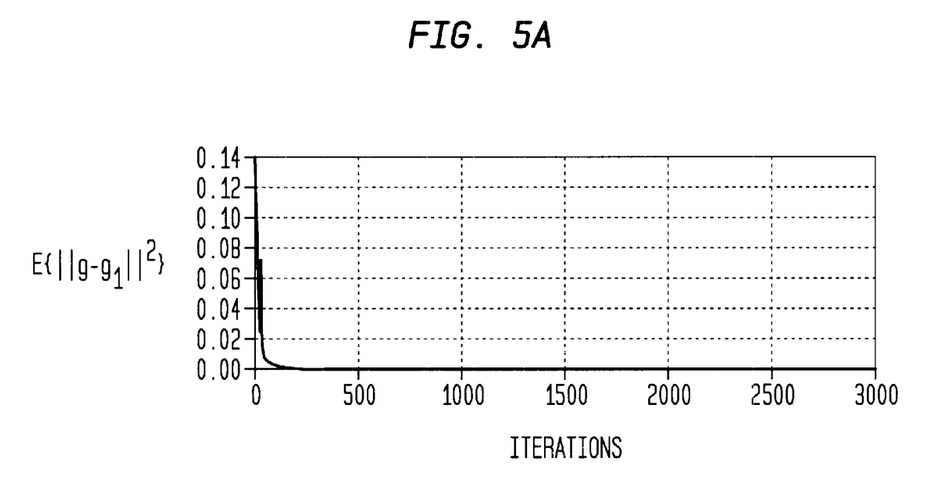
FIGS. 5a and 5b are graphs of channel estimation error of RLS methods for asynchronous and synchronous cases, respectively.
Figure 5B:
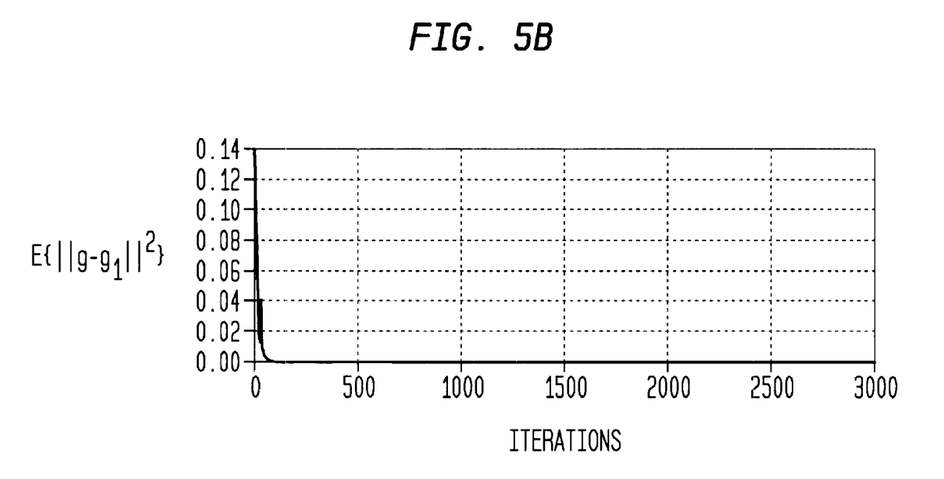

Next we investigate the behavior of our RLS algorithm in Table 4 and again employ the trained MMSE receiver implementated by the RLS method (Haykin) for comparison. Both asynchronous and synchronous systems were studied. FIG. 4 depicts the output SINR (mean±standard deviation) versus time for the proposed (solid line) and the trained MMSE receiver (dashed line) method. It can be seen that both of them converge faster to slightly higher levels than corresponding LMS methods at the expense of increased computational cost. FIG. 5 shows the channel estimation error which also converges faster. From both FIG. 5(a) for the asynchronous case and FIG. 5(b) for the synchronous case, we can conclude that the RLS method can be used to estimate the channel parameters within 100 iterations.

Figure 6A:
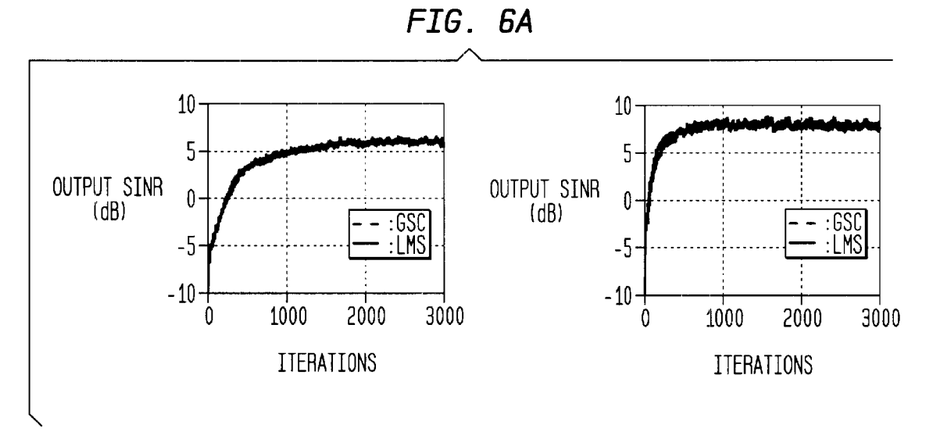
FIGS. 6a and 6b are graphs of SNIR comparison of LMS and GSC methods with fixed step sizes for asynchronous and synchronous cases, respectively.
Figure 6B:
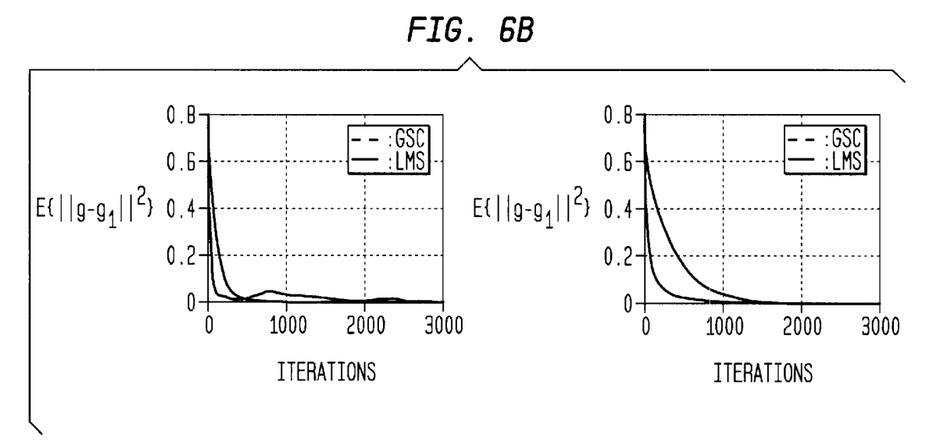

In order to evaluate the different variations of the proposed algorithm we next compare the LMS Method I with the GSC algorithm of Method III. Under the same initial conditions and using the fixed step sizes for each iteration, these two methods were simulated and the results are shown in FIG. 6. FIGS. 6(a) and 6(b) depict the output SINR for the asynchronous and synchronous case respectively, while FIGS. 6(c) and 6(d) show the channel estimation errors for these two cases. The results indicate that the two methods exhibit equivalent performance in terms of SINR, but they behave differently in channel parameter estimation (see FIGS. 6(c) and 6(d)).

Figure 7A:
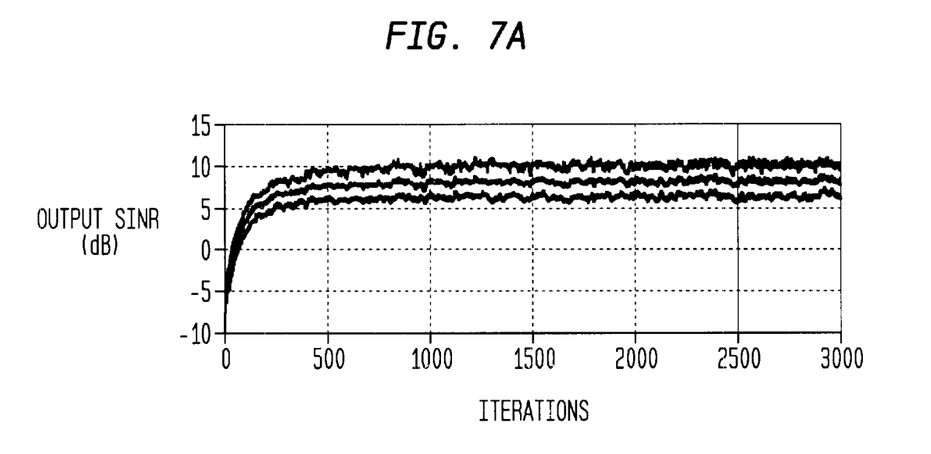
FIGS. 7a and 7b are graphs of step size effect on the performance of the LMS method for synchronous case.
Figure 7B:
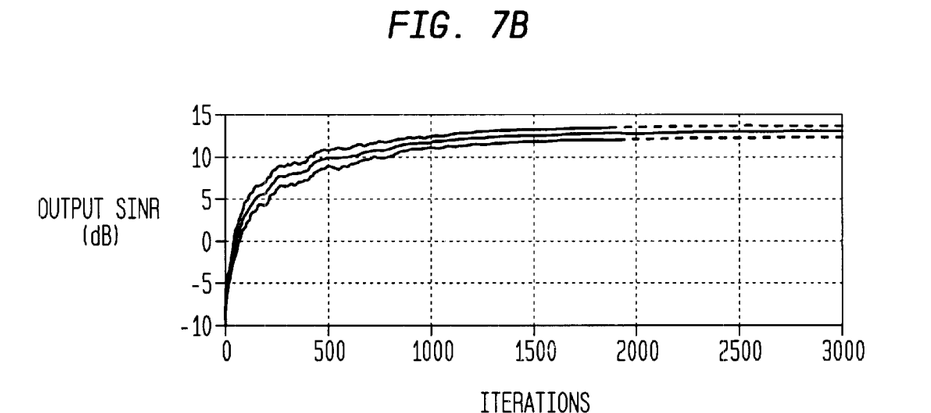

In the last experiment, the effect of step size on the performance of the proposed LMS method was studied and the output SINR is plotted in FIG. 7. A constant step size was used in FIG. 7(a) while in FIG. 7(b) the step size was reduced every 200 iterations. As expected, smaller variance and higher SINR are achieved in the latter case.

The contribution of this invention lies in the derivation of blind adaptive solutions for interference cancellation in CDMA systems. LMS and RLS based constrained optimization methods are developed, which jointly optimize the receiver and constraint parameters. Furthermore, it is shown that the proposed methods enjoy global convergence. Experimental results indicate that their performance is substantially better than existing methods and close to that of the trained MMSE receiver.

The receiver adaptively optimizes the filter parameters so that the energy of the filter output is kept to a minimum. At the same time, it cleverly exploits a priori knowledge of the user's signature code waveform to avoid cancelling the signal from the desired user. This is accomplished by employing certain constraints in the optimization recursion.

The algorithm is therefore applicable to cases where the signature code of the user of interest is a priori known. No knowledge of the codes of the interfering users is required.

In a wireless environment the signature of the user of interest is typically distorted by multipath effects (reflections from buildings, etc.). For this reason, the user's signature employed in the constrained optimization recursion is also parametrized by a number of coefficients related to the multipath environment. Since the multipath structure is unknown, and changes with time as a mobile user moves, the multipath parameters are also recursively updated and optimized.

In Tables 1 and 2, a Least-Mean-Square version of the recursion is presented. For every new bit waveform y(n) received, the filter parameters f(n) are updated using step 3.1. Notice that the update also depends on the multipath parameters g(n) and the priori known code matrix C. The remaining steps are concerned with updating g(n). In Table 1 this is accomplished in step 3.4 while in Table 2 in step 3.2. The two methods have shown similar performance.

In Table 3, a different parametrization of filter vector f(n) is used; f(n) is computed through the vectors g(n) and u)n) in step 2.5. Those vectors in turn are updated through a joint recursion provided by steps 2.3 and 2.4.

Finally, this method employs a Recursive-Least-Squares optimization strategy and offers improved performance at a higher computational cost. The main recursion is presented in step 2.2 of Table 4, where the data correlation matrix is updated given a new data vector y(n). Based on this matrix, the multipath vector g(n) is obtained through an eigen decomposition operation in step 2.3. Finally, the filter parameters f(n) are updated in step 2.4.

Figure 8:
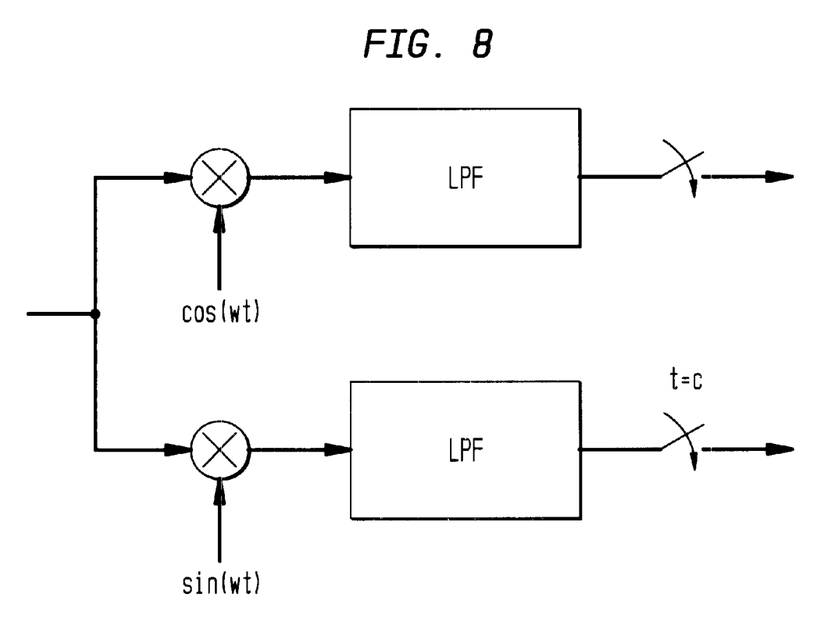
FIG. 8 is a simplified block diagram of the front end of a receiver.

A simplified block diagram for the receiver's front end is shown in FIG. 8. The received RF signal y(t) is demodulated using the in phase (cosine) and quadrature phase (sine) component of the carrier frequency. The two components are then passed through chip rate filters (generally low pass filters the bandwidth of which is matched to the bandwidth of the transmitted chip pulses). The outputs of those filters are sampled at least at the chip rate (or multiples of it) and provide the real and imaginary part of the digitized complex baseband signal y(n).

Figure 9:
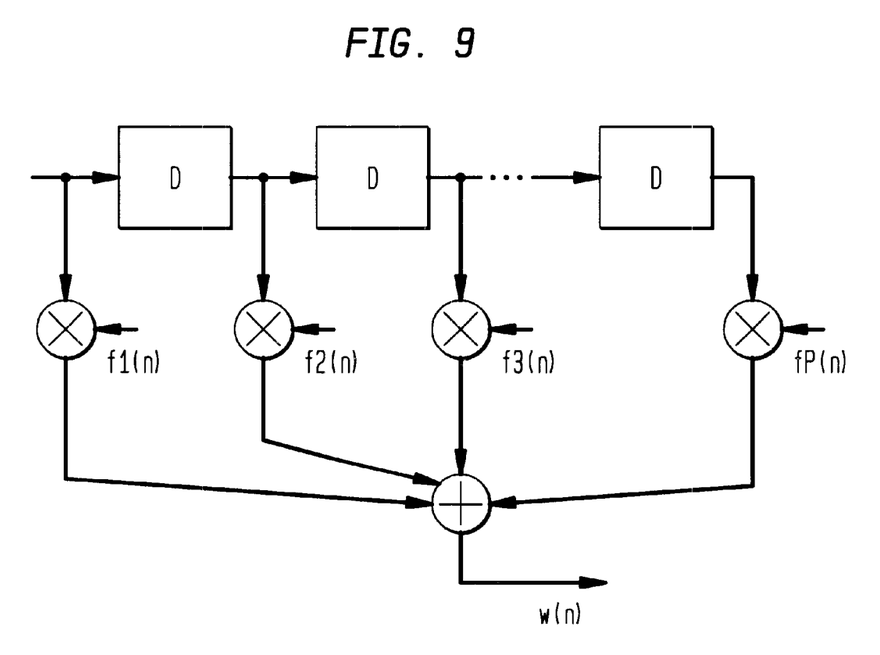
FIG. 9 is a block diagram of the filtering operation.

The digitized signal is then processed as follows: All data samples for bit period n are collected in a vector y(n) and are multiplied by the filter vector f(n). FIG. 9 shows the implementation of the filtering operation which entails the multiplication of each sampled point with the corresponding filter coefficient followed by the summation of all products. The elements of the data vector y(n) are stored in the tap delay line on the top of the Figure. This filtering operation has to be repeated once every new incoming bit waveform is obtained. The implementation of the filtering operation is straightforward on a DSP processor or other computing platform.

The novelty of the invention resides on the self-adapting algorithm capable of adjusting the filter coefficients fk(n) based on the statistical properties of the received signal y(n) and filtered output w(n). We use shorthand vector and matrix notation and present the required computations as products of vectors and matrices to represent the adaptation procedure. The required commutations are summarized in the four tables.

Having thus described the invention in detail, it is to be understood that the foregoing description is not intended to limit the spirit and scope thereof. What is desired to be protected by Letters Patent is set forth in the appended claims.

What is claimed is:

1. An adaptive code-division multiple-access (CDMA) receiver for a CDMA communication system comprising:

digital filter means in a receiver for suppressing multiuser and multi-path interference, said filter being programmed in accordance with the following algorithm:

$$f(n):f(n+1)=[I-C(C^HC)^{-1}C^H][f(n)-m_{\hat{y}}(n)y^H(n)f(n)]+C(C^HC)^{-1}g(n)$$

wherein y(n) is a data vector for each transmitted bit, $W_1(n)$ from user 1;

means in said receiver for estimating y(n), by filtering y(n), i.e. $w_1(n)=f^H(n)y(h)$, where $^H$ denotes Hermitian; g(n) corresponds to the multipath parameters updated by a separate revision; and C is a matrix constructed from elements of the desired user's spreading code.

2. The receiver of claim 1 wherein the digital filter means minimize the output energy in response to each input signal received by the digital filter.

3. A filter algorithm for suppressing multi-user interference in a CDMA receiver, said algorithm being self recovering, whereby it does not require cooperation of the transmitter in order to synchronize and adapt, comprising:

a digital filter;

adaptive means in said algorithm for changing the parameters of said digital filter;

means for measuring the output energy of said digital filter, means, responsive to said output energy of said filter for minimizing said output energy in response to each input signal received by said digital filter in accordance with the following algorithm:

$$f(n+1)=[I-C(C^HC)^{-1}C^H][f(n)-m_{\hat{y}}(n)y^H(n)f(n)]+C(C^HC)^{-1}g(n)$$

wherein y(n) is a data vector for each transmitted bit $W_1(n)$ from user 1;

means in said receiver for estimating y(n), by filtering y(n), i.e. $w_1(n)=f^H(n)y(h)$, where $^H$ denotes Hermitian; g(n) corresponds to the multipath parameters updated by a separate revision; and C is a matrix constructed from elements of the desired user's spreading code.

4. A method of rejecting interference in a wireless communication system comprising the steps of:

receiving a signal in a wireless receiver; and digitally filtering said received signal by continuously adjusting the interference rejection to adapt to a changing interference environment in accordance with the algorithm:

$$f(n) \text{ as } f(n+1)=[I-C(C^HC)^{-1}C^H][f(n)-m_{\hat{y}}(n)y^H(n)f(n)]+C(C^HC)^{-1}g(n),$$

where y(n) is a data vector for each transmitted bit $W_1(n)$ from a user.

5. The method of claim 4 wherein said wireless communications system has a number of simultaneous users transmitting in the same frequency band and at the same time and where each of said users has a distinct signature waveform or chip waveform to transmit their data said method further in including the step of rejecting undesired users and demodulating the user of interest.

6. The method of claim 5 further including the steps of digitizing said incoming receiver signal; and sampling said digitized incoming signal at least once per chip period for collecting a number of digital samples per bit.

7. The method of claim 6 further including the step of adaptively filtering said sample signal.

8. The method of claim 7 further including the steps of employing said desired user's distinct waveform in a constrained optimization recursion; and parameterizing said desired user's distinct waveform by a number of coefficients related to a multipath environment.

9. The method of claim 8 further including the step of recursively updating and optimizing said multipath coefficients.

10. The method of claim 7 further including the steps of performing a least-mean-square recursion; receiving each new bit waveform y(n) and updating the filter parameters f(n) based on multipath parameters g(n) and said desired user's distinct waveform.

11. The method of claim 7 further including the steps of performing a recursive least squares update; receiving each new bit waveform y(n) and updating the filter parameters f(n) based on multipath parameters g)n) and said desired user's distinct waveform.

* * * * *